United States Patent
Nakagawa

(10) Patent No.: US 9,571,790 B2
(45) Date of Patent: Feb. 14, 2017

(54) RECEPTION APPARATUS, RECEPTION METHOD, AND PROGRAM THEREOF, IMAGE CAPTURING APPARATUS, IMAGE CAPTURING METHOD, AND PROGRAM THEREOF, AND TRANSMISSION APPARATUS, TRANSMISSION METHOD, AND PROGRAM THEREOF

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/970,252

(22) Filed: Dec. 15, 2015

(65) Prior Publication Data
US 2016/0100132 A1 Apr. 7, 2016

Related U.S. Application Data

(63) Continuation of application No. 14/141,298, filed on Dec. 26, 2013, now Pat. No. 9,241,132.

(30) Foreign Application Priority Data

Dec. 28, 2012 (JP) .................................. 2012-287236

(51) Int. Cl.
 H04N 7/15 (2006.01)
 H04N 21/235 (2011.01)
 H04N 21/262 (2011.01)
 H04N 21/845 (2011.01)

(52) U.S. Cl.
 CPC ............ *H04N 7/15* (2013.01); *H04N 21/2353* (2013.01); *H04N 21/26258* (2013.01); *H04N 21/8456* (2013.01)

(58) Field of Classification Search
 CPC .. H04N 7/15; H04N 21/235; H04N 21/26258; H04N 21/8456
 USPC ...... 348/14.12, 158, 211.2; 375/220, 240.01; 386/291, 239; 701/532; 709/204, 224, 231, 709/232; 340/5.72; 358/404; 370/336; 380/240
 See application file for complete search history.

(56) References Cited

U.S. PATENT DOCUMENTS

| | | | | |
|---|---|---|---|---|
| 4,623,920 A | * | 11/1986 | Dufresne | H04N 7/1675 348/E7.056 |
| 4,910,604 A | * | 3/1990 | Takei | G11B 27/105 348/E7.024 |
| 5,457,544 A | * | 10/1995 | Ochiai | H04N 1/32363 358/404 |
| 5,757,788 A | * | 5/1998 | Tatsumi | H04J 3/22 370/336 |

(Continued)

*Primary Examiner* — Gerald Gauthier
(74) *Attorney, Agent, or Firm* — Canon USA Inc., IP Division

(57) ABSTRACT

A reception apparatus configured to receive content data including a plurality of pieces of segment data includes a metadata reception unit configured to receive metadata indicating a reproduction order of the segment data, an acquisition unit configured to acquire storage information indicating whether the reception apparatus is in a storage mode for storing the content data, and a control unit configured to, if the storage information does not indicate the storage mode, perform control to transmit a request for acquiring a piece of segment data that is later in the reproduction order than a piece of the segment data to be requested to be acquired if the storage information indicates the storage mode.

15 Claims, 10 Drawing Sheets

(56) References Cited

U.S. PATENT DOCUMENTS

| | | | | |
|---|---|---|---|---|
| 7,091,824 B2* | 8/2006 | Matsubara | ............ | B60R 25/209 |
| | | | | 180/287 |
| 7,719,567 B2* | 5/2010 | Renkis | ................ | G08B 13/196 |
| | | | | 348/158 |
| 7,818,446 B2* | 10/2010 | Katayama | ............ | H04N 21/643 |
| | | | | 709/232 |
| 8,401,060 B2* | 3/2013 | Kim | ...................... | H04L 67/104 |
| | | | | 370/310 |
| 8,874,373 B2* | 10/2014 | Nakamura | ............. | G01C 21/32 |
| | | | | 340/995.1 |
| 8,995,824 B2* | 3/2015 | McCarthy | ............ | G11B 27/034 |
| | | | | 386/248 |
| 9,241,132 B2* | 1/2016 | Nakagawa | ......... | H04N 21/2353 |
| 2010/0125661 A1* | 5/2010 | Perala | ................... | G06F 15/173 |
| | | | | 709/224 |
| 2013/0046902 A1* | 2/2013 | Villegas Nunez | ............. | H04N 21/23424 |
| | | | | 709/231 |
| 2014/0184734 A1* | 7/2014 | Nakagawa | ......... | H04N 21/2353 |
| | | | | 348/14.12 |
| 2015/0120833 A1* | 4/2015 | De Foy | ................ | H04L 67/1097 |
| | | | | 709/204 |
| 2016/0100132 A1* | 4/2016 | Nakagawa | ......... | H04N 21/2353 |
| | | | | 348/14.12 |

* cited by examiner

RECEPTION APPARATUS, RECEPTION METHOD, AND PROGRAM THEREOF, IMAGE CAPTURING APPARATUS, IMAGE CAPTURING METHOD, AND PROGRAM THEREOF, AND TRANSMISSION APPARATUS, TRANSMISSION METHOD, AND PROGRAM THEREOF

CROSS-REFERENCE TO RELATED APPLICATIONS

This is a continuation application of U.S. patent application Ser. No. 14/141,298 filed on Dec. 26, 2013 which claims the benefit of Japanese Patent Application No. 2012-287236 filed Dec. 28, 2012, both of which are hereby incorporated by reference herein in their entirety.

BACKGROUND

Field

Aspects of the present invention generally relate to a reception apparatus, a reception method, and a program thereof, an image capturing apparatus, an image capturing method, and a program thereof, and a transmission apparatus, a transmission method, and a program thereof.

Description of the Related Art

In recent years, streaming techniques for transmitting and receiving content data in real time have been put to practical use in network cameras, video conference systems, and other systems. In the streaming techniques, while content data is being received, simultaneously, the received content data can be reproduced.

Such streaming techniques include standardized streaming techniques such as HTTP Live Streaming (IETF draft HTTP Live Streaming draft-pantos-http-live-streaming-09), and MPEG-DASH (ISO/IEC 23009-1). In these standards, a transmission apparatus divides content data such as video data and audio data at predetermined time intervals to generate a plurality of pieces of segment data. Further, the transmission apparatus sends metadata (referred to as playlist) including the location information and reproduction order of each of the generated segment data to a reception apparatus. Based on the location information and reproduction order of each segment data described in the received playlist, the reception apparatus acquires the segment data. As described above, in the above-mentioned standards, the playlist and the segment data are continuously transmitted and received at predetermined time intervals between the transmission apparatus and the reception apparatus, and this enables streaming of the content data.

As a conventional technique for enabling the streaming of content data, Japanese Unexamined Patent Application Publication (Translation of PCT Application) No. 2008-523718 discusses a technique for segmenting audio and video content into a plurality of small clips to allow simultaneous download and reproduction thereof. Japanese Unexamined Patent Application Publication (Translation of PCT Application) No. 2008-523718 discusses a method of storing metadata of a plurality of small clips in a local storage device and starting reproduction of the small clips. According to the method, while the second clip in the small clips is downloaded, the content of the first clip in the small clips can be displayed.

In the above-described conventional technique, however, for example, due to a communication delay between the transmission apparatus and the reception apparatus or a delay in processing by the reception apparatus, the real-time performance of video data reproduction may decrease. For example, in the above-described conventional technique, when a communication delay between the transmission apparatus and the reception apparatus or a delay in processing by the reception apparatus occurs, the timing of transmitting a playlist and each segment data from the transmission apparatus may be delayed from the timing of generating each segment data in the transmission apparatus. In such a case, the number of pieces of segment data generated by the transmission apparatus is larger than the number of pieces of segment data transmitted from the transmission apparatus, and consequently, it is necessary to control the segment data to be transmitted by the transmission apparatus and received by the reception apparatus.

For this purpose, among a plurality of pieces of segment data generated by the transmission apparatus, only the piece of segment data that is lower in the reproduction order is transmitted and received to solve the delay and ensure the real-time performance of the content data reproduced after received by the reception apparatus. In such a case, however, among the plurality of pieces of segment data generated by the transmission apparatus, the piece of segment data that is higher in the reproduction order is not transmitted or received. Consequently, the content data stored after received by the reception apparatus may be discontinuous.

SUMMARY

Aspects of the present invention are generally directed to a reception apparatus for receiving a plurality of pieces of segment data obtained by dividing content data, which controls the segment data to be received, depending on whether to store the content data received by the reception apparatus.

According to an aspect of the present invention, a reception apparatus configured to receive content data including a plurality of pieces of segment data includes a metadata reception unit configured to receive metadata indicating a reproduction order of the segment data, an acquisition unit configured to acquire storage information indicating whether the reception apparatus is in a storage mode for storing the content data, and a control unit configured to, if the storage information does not indicate the storage mode, perform control to transmit a request for acquiring a piece of segment data that is later in the reproduction order than a piece of segment data to be requested to be acquired if the storage information indicates the storage mode.

Further features of the present disclosure will become apparent from the following description of exemplary embodiments with reference to the attached drawings.

DESCRIPTION OF THE EMBODIMENTS

Various exemplary embodiments will be described in detail below with reference to the drawings.

Processing of the overall system according to a first exemplary embodiment of the present invention will be described with reference to FIG. 1.

Figure 1:
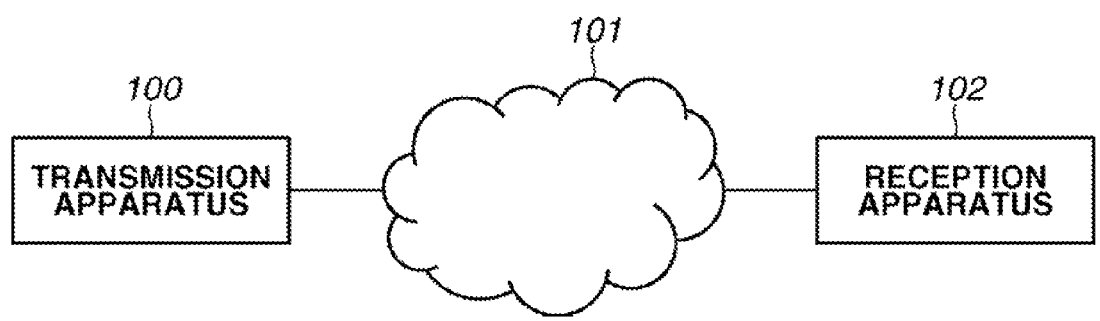
FIG. 1 illustrates a connection configuration of a transmission apparatus and a reception apparatus according to a first exemplary embodiment and second exemplary embodiment.

FIG. 1 illustrates an example of a connection configuration of a transmission apparatus 100 and a reception apparatus 102 according to the first exemplary embodiment. In the first exemplary embodiment, the transmission apparatus 100 and the reception apparatus 102 are interconnected via a network 101.

The transmission apparatus 100 and the reception apparatus 102 transmits and receives respectively, via the network 101, pieces of segment data obtained by dividing content data at predetermined time intervals, and metadata (hereinafter referred to as playlist) including reproduction section information about each segment data. This enables streaming of the content data between the transmission apparatus 100 and the reception apparatus 102. The content data includes video data and audio data. In the first exemplary embodiment, an example will be described in which the transmission apparatus 100 transmits video data as the content data to the reception apparatus 102. However, the present embodiment is not limited to this example. A similar processing method can be used when the transmission apparatus 100 transmits audio data as the content data to the reception apparatus 102. A playlist is metadata that describes, for example, the reproduction order, location information (such as uniform resource locator (URL)), and reproduction time of each segment data. In the first exemplary embodiment, as a format of the playlist, the text-based M3U8 format is used. A playlist in the M3U8 format will be described below in detail with reference to FIG. 6.

The network 101 includes, for example, the Internet, a wired local area network (LAN), or a wireless LAN. In the first exemplary embodiment, it is assumed that a wired LAN or a wireless LAN serving as a home network is used as the network 101. The present embodiment, however, has no limitations on the communication standard, size, and configuration of the network 101. As the communication standard for the network 101, for example, a wide area network (WAN), an ad hoc network, Bluetooth®, Zigbee®, or ultra-wide band (UWB) can be used.

The transmission apparatus 100 transmits a playlist based on a request for acquiring the playlist, and transmits segment data based on a request for acquiring the segment data. These requests are transmitted from the reception apparatus 102 via the network 101. As the transmission apparatus 100, a camera, a video camera, a smart phone, a cellular phone, or a personal computer (PC) can be used, for example. However, the present embodiment is not limited thereto. Any apparatus satisfying the hardware configuration and the module configuration described below can be used as the transmission apparatus 100. Further, the video data to be transmitted by the transmission apparatus 100 may be generated in the transmission apparatus 100, or may be transmitted to the transmission apparatus 100 after generated in another server apparatus.

The reception apparatus 102 receives a playlist (metadata) and segment data that are transmitted from the transmission apparatus 100 via the network 101. Further, in the first exemplary embodiment, the reception apparatus 102 has functions of reproducing and storing received video data. The video data received by the reception apparatus 102 may be transmitted to another apparatus, and reproduced and stored in the apparatus. The reception apparatus 102 is, for example, a smart phone, a cellular phone, a PC, or a television. However, the present embodiment is not limited thereto. Any apparatus satisfying the hardware configuration and the module configuration described below can be used as the reception apparatus 102. The number of the reception apparatuses 102 to be connected to the network 101 may be one or more than one.

The transmission apparatus 100 according to the first exemplary embodiment will be described with reference to FIG. 2 and FIG. 3.

Figure 2:
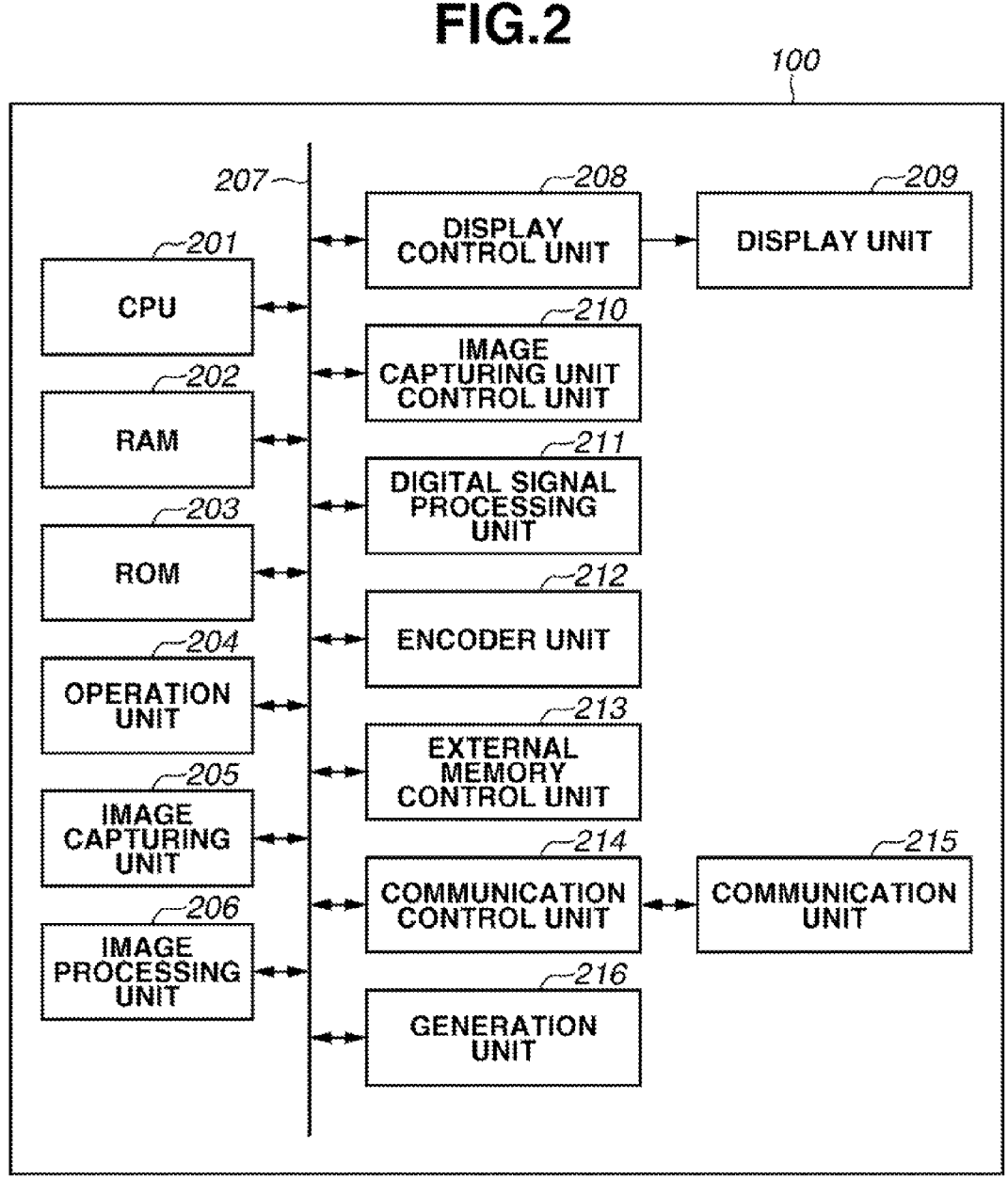
FIG. 2 is a block diagram illustrating an example of an internal configuration of the transmission apparatus according to the first exemplary embodiment.

FIG. 2 is a block diagram illustrating an internal configuration of the transmission apparatus 100 according to the first exemplary embodiment.

A central processing unit (CPU) 201 performs overall control of each component described below. A random access memory (RAM) 202 serves as a main memory, a work area, or the like of the CPU 201. A read-only memory (ROM) 203 stores a control program to be executed by the CPU 201. An operation unit 204 receives instructions from users, and includes buttons and a mode dial.

An image capturing unit 205 receives optical information (a signal) of an object with an image sensor, and performs analog-to-digital conversion (A/D conversion) of the received signal to obtain video data. An image processing unit 206 performs image processing using the video data obtained by the image capturing unit 205, or the video data output from a digital signal processing unit 211. A bus 207 serves as a path for transferring various kinds of data. For example, the video data obtained by the image capturing unit 205 is transmitted to a predetermined processing unit via the bus 207.

A display control unit 208 controls display of images and characters displayed on a display unit 209. The display unit 209 displays images and characters obtained by the image capturing unit 205. For example, a liquid crystal display is used as the display unit 209. The display unit 209 may have a touch screen function. In such a case, a user instruction with the touch screen can be treated equally to an input via the operation unit 204. An image capturing unit control unit 210 performs control of the image capturing system, for example, focusing, opening and closing of a shutter, and adjustment of a diaphragm, according to an instruction from the CPU 201. A digital signal processing unit 211 performs various kinds of processing, such as white balance processing, gamma correction processing, and noise reduction processing, on the video data received from the image capturing unit 205 via the bus 207.

An encoder unit 212 uses the Moving Picture Experts Group-2 (MPEG-2) system to perform compression coding (hereinafter referred to as encoding) of the video data output from the image capturing unit 205 or from the digital signal processing unit 211, and multiplexes the data using the MPEG-2 transport stream (MPEG-2 TS) system to generate each segment data. In general, the amount of information of video data is large, and to transmit and receive the video data via a network, encoded data is used. The MPEG-2 TS is a container format for multiplexing encoded video data and transmitting the data. In the first exemplary embodiment, the encoder unit 212 divides the encoded video data into segment data at predetermined time intervals. The method of dividing the video data is not limited to the method of dividing the data at predetermined time intervals, and other methods can be used for the division. For example, the data can be divided by a predetermined information amount.

An external memory control unit 213 is an interface for connecting to a PC or other media (for example, a hard disk, a memory card, a CompactFlash (CF) (registered trademark) card, a Secure Digital (SD) card, and a universal serial bus (USB) memory).

A communication control unit 214 controls a communication unit 215. The communication control unit 214 performs communication control of a video distribution request from the reception apparatus 102, and communication control of video data to be transmitted to the reception apparatus 102. The communication control processing by the communication control unit 214 will be described in detail below.

The communication unit 215 acquires a playlist generated by a generation unit 216, and segment data generated by the encoder unit 212, and transmits the playlist and the segment data to the reception apparatus 102. Further, the communication unit 215 receives control information transmitted from the reception apparatus 102. In the first exemplary embodiment, the communication unit 215 uses the Hypertext Transfer Protocol (HTTP) as the communication protocol.

The generation unit 216 generates a playlist containing reproduction section information about the segment data generated by the encoder unit 212. The processing for generating a playlist in the generation unit 216 will be described in detail below.

The transmission apparatus 100 can include components other than the above-described processing units. The descriptions of the other components are omitted since the other components are not the object of the present embodiment.

Now, the processing of generating a playlist by the transmission apparatus 100 according to the first exemplary embodiment will be described in detail.

Figure 3:
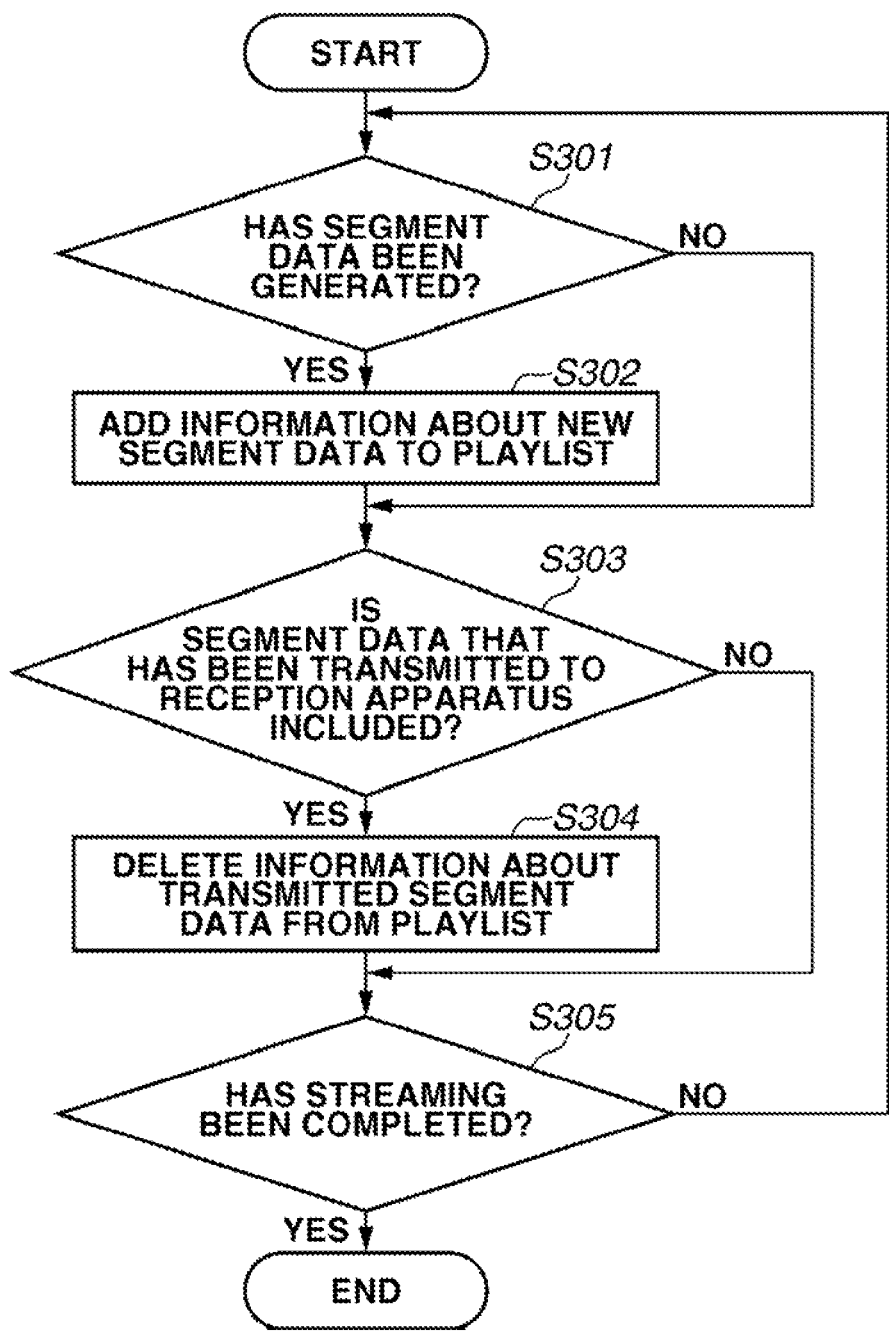
FIG. 3 is a flowchart illustrating an example of a playlist generation processing procedure performed by a generation unit in the transmission apparatus according to the first exemplary embodiment.

FIG. 3 is a flowchart illustrating an example of the playlist generation processing procedure performed by the generation unit 216 in the transmission apparatus 100 according to the first exemplary embodiment.

In step S301, the generation unit 216 determines whether segment data has been generated by the encoder unit 212. In the first exemplary embodiment, the generation unit 216 determines whether the encoder unit 212 has completed generating segment data by dividing encoded video data at predetermined time intervals.

In step S301, if the generation unit 216 determines that segment data has been generated (YES in step S301), in step S302, the generation unit 216 adds reproduction section information about the newly generated segment data to the playlist. In step S301, if the generation unit 216 determines that segment data has not been generated (NO in step S301), the processing proceeds to step S303.

In step S303, the generation unit 216 determines whether the segment data indicated in the playlist includes the segment data that has been transmitted to the reception apparatus 102.

In step S303, if the generation unit 216 determines that the segment data in the playlist includes the segment data that has been transmitted (YES in step S303), in step S304, the generation unit 216 deletes the reproduction section information about the transmitted segment data from the playlist.

In step S303, if the generation unit 216 determines that the segment data in the playlist does not include the segment data that has been transmitted (NO in step S303), or the processing in step S304 has been completed, in step S305, the generation unit 216 determines whether the streaming has been completed. Here, the generation unit 216 can determine whether the streaming has been completed, for example, by determining whether the operation unit 204 has received a streaming end instruction from the user, or whether the communication unit 215 has received a streaming end request from the reception apparatus 102.

In step S305, if the generation unit 216 determines that the streaming has not been completed (NO in step S305), the processing returns to step S301. Then, processing for generating a playlist relating to the subsequent segment data is performed. An example of the playlist to be generated will be described below with reference to FIG. 6.

Next, the reception apparatus 102 according to the first exemplary embodiment will be described with reference to FIG. 4 and FIG. 5.

Figure 4:
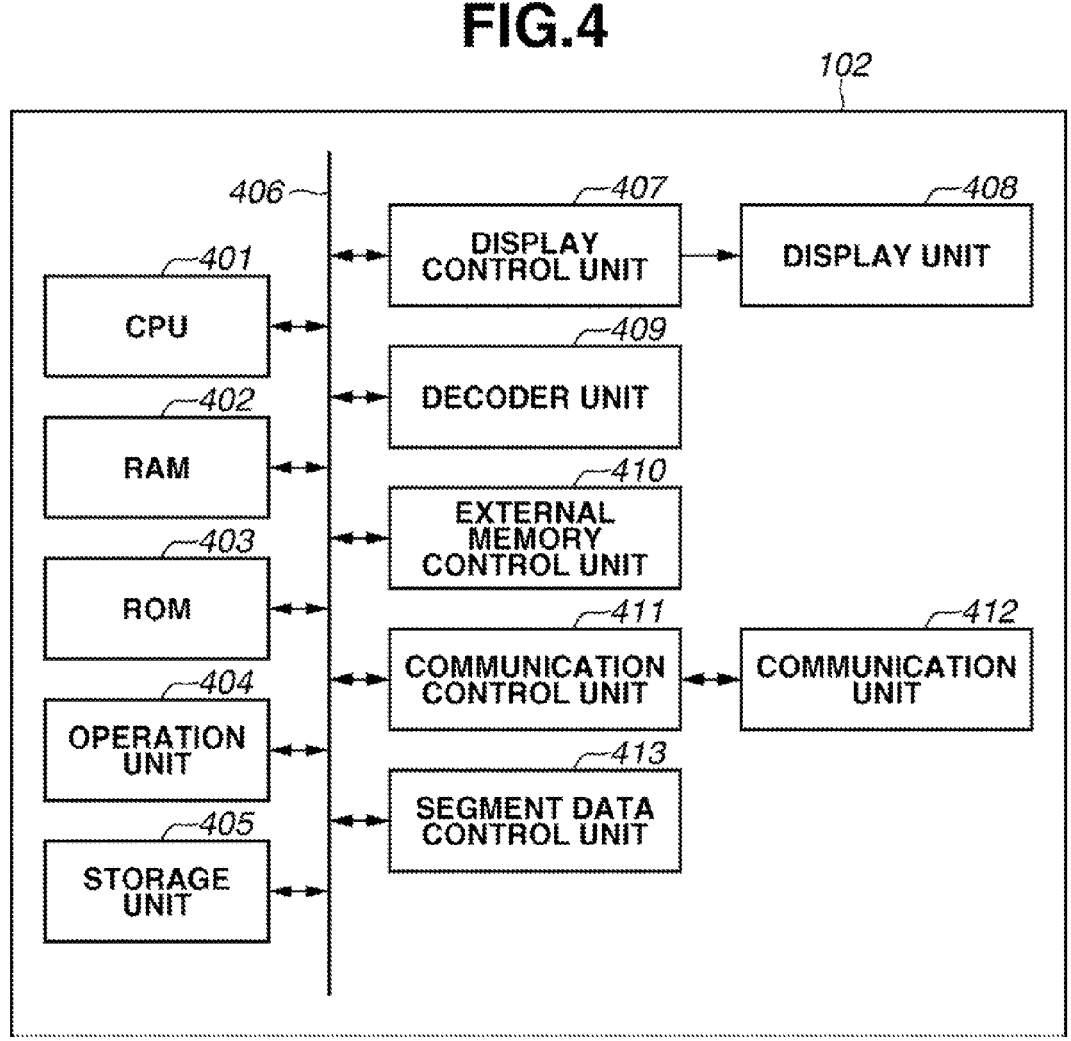
FIG. 4 is a block diagram illustrating an example of an internal configuration of the reception apparatus according to the first exemplary embodiment.

FIG. 4 is a block diagram illustrating an internal configuration of the reception apparatus 102 according to the first exemplary embodiment.

A CPU 401 performs overall control of each component described below.

A RAM 402 serves as a main memory, a work area, or the like of the CPU 401.

A ROM 403 stores a control program to be executed by the CPU 401.

An operation unit 404 receives instructions from users, and includes buttons and a mode dial.

A storage unit 405 stores video data received by a communication unit 412 via an external memory control unit 410.

A bus 406 serves as a path for transferring various kinds of data. For example, the video data received by the communication unit 412 is transmitted to a predetermined processing unit via the bus 406.

A display control unit 407 controls display of images and characters displayed on a display unit 408.

The display unit 408 displays images and characters received by the communication unit 412. For example, a liquid crystal display is used as the display unit 408. The display unit 408 may have a touch screen function. In such a case, a user instruction with the touch screen can be treated equally to an input via the operation unit 404.

A decoder unit 409 uses the MPEG-2 TS system to demultiplex video data received by the communication unit 412, and further decodes the demultiplexed video data using the MPEG-2 system.

The external memory control unit 410 is an interface for connecting to a PC or other media (for example, a hard disk, a memory card, a CF card, an SD card, and a USB memory).

A communication control unit 411 controls the communication unit 412. The communication control unit 411 performs communication control of video data received from the transmission apparatus 100, or of a video distribution request and control information to be transmitted to the transmission apparatus 100. The communication control processing by the communication control unit 411 will be described in detail below with reference to FIG. 5.

The communication unit 412 receives a playlist and segment data transmitted from the transmission apparatus 100, and transmits control information to the transmission apparatus 100.

A segment data control unit 413 analyses, for example, the reproduction order, location information (a URL, for example), and reproduction time (a time length) of each segment data, from a playlist transmitted from the transmission apparatus 100 to control the segment data to be received.

Next, the reception control of video data by the reception apparatus 102 according to the first exemplary embodiment will be described in detail.

Figure 5:
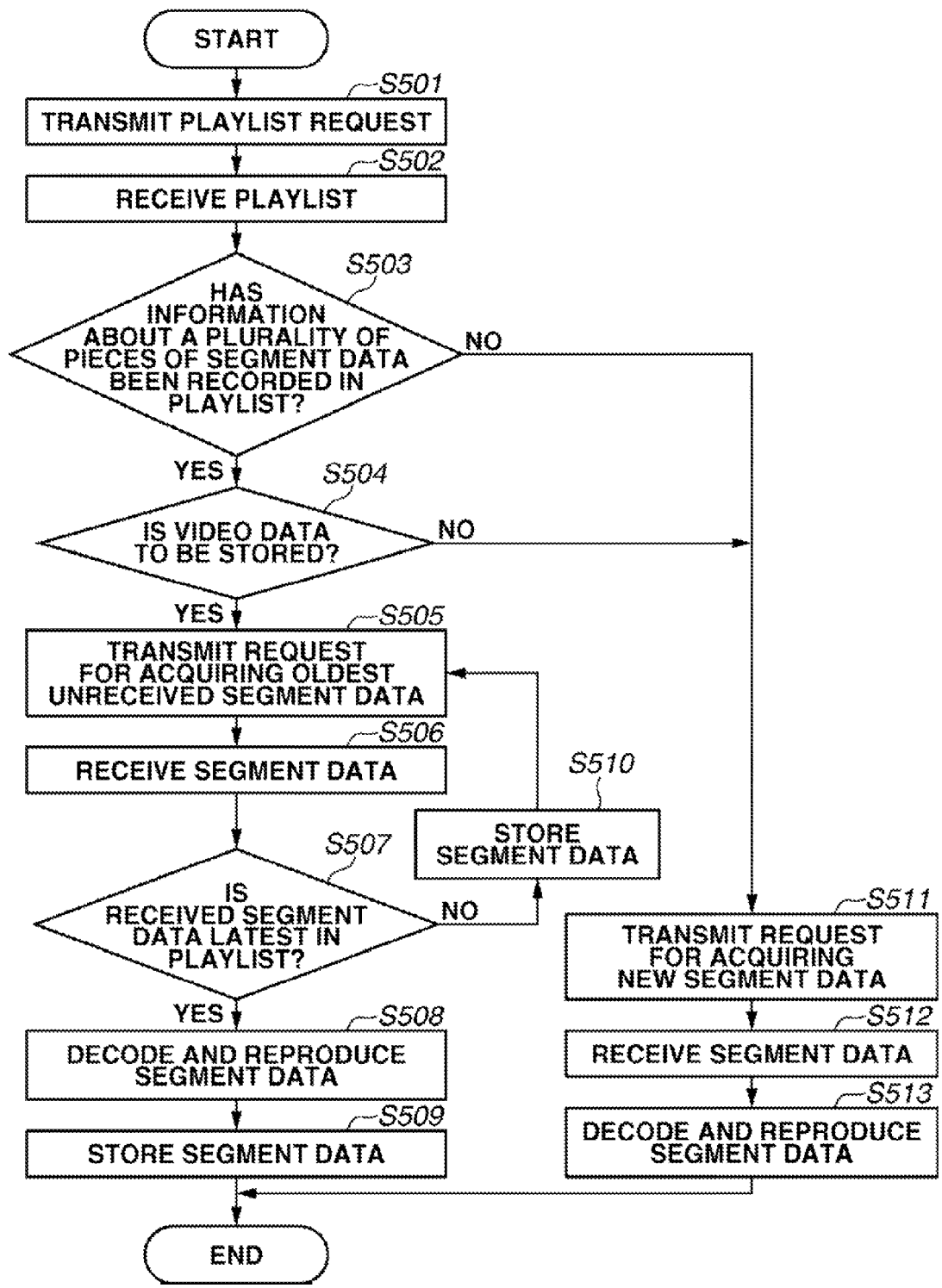
FIG. 5 is a flowchart illustrating an example of a procedure of segment data reception control processing performed by the reception apparatus according to the first exemplary embodiment.

FIG. 5 is a flowchart illustrating an example of the segment data reception control processing procedure performed by the reception apparatus 102 according to the first exemplary embodiment.

In step S501, the communication control unit 411 transmits a request for acquiring a playlist (hereinafter referred to as a playlist request) to the transmission apparatus 100. Here, it is assumed that the HTTP GET method is used for transmitting the playlist request, and the reception apparatus 102 has been notified of the URL for the playlist request from the transmission apparatus 100 in advance. Further, although the playlist request can be transmitted at any timing, transmitting the request in accordance with the time interval for generating segment data can reduce unnecessary communications.

In step S502, the communication unit 412 receives the playlist transmitted according to the playlist request in step S501 from the transmission apparatus 100.

In step S503, the segment data control unit 413 determines whether, in the playlist received by the communication unit 412 in step S502, reproduction section information about a plurality of pieces of segment data is described.

In the first exemplary embodiment, the transmission apparatus 100 regularly generates segment data at predetermined time intervals. Consequently, due to a communication delay between the transmission apparatus 100 and the reception apparatus 102, a processing delay by the reception apparatus 102, or other reasons, the timing of transmitting a playlist request from the reception apparatus 102 may be delayed from the timing of generating a piece of segment data in the transmission apparatus 100. In such a case, reproduction section information about a plurality of pieces of segment data is described in the playlist generated by the transmission apparatus 100. On the other hand, if the timing of generating a piece of segment data in the transmission apparatus 100 and the timing of transmitting a playlist request from the reception apparatus 102 match each other, in the playlist generated by the transmission apparatus 100, reproduction section information about a single piece of segment data is described.

In step S503, if the segment data control unit 413 determines that reproduction section information about a plurality of pieces of segment data is described in the playlist (YES in step S503), in step S504, the segment data control unit 413 determines whether the video data received by the reception apparatus 102 is to be stored. Here, the segment data control unit 413 can determine whether the video data received by the reception apparatus 102 is to be stored, by determining a storage mode (storage information) selected on the operation unit 404 by the user and set in the RAM 402. However, the present embodiment is not limited thereto. A storage mode can be set in the RAM 402, or the like in advance, and the segment data control unit 413 can determine whether the video data received by the reception apparatus 102 is to be stored, based on the storage mode set in the RAM, or the like. Alternatively, the segment data control unit 413 can determine whether the video data received by the reception apparatus 102 is to be stored, based on whether the reception apparatus 102 is in a streaming reproduction mode that reproduces the received video data simultaneously while receiving video data. More specifically, if the reception apparatus 102 is in the streaming reproduction mode, the segment data control unit 413 determines that the video data received by the reception apparatus 102 is not to be stored. If the reception apparatus 102 is not in the streaming reproduction mode, the segment data control unit 413 determines that the video data received by the reception apparatus 102 is to be stored.

In step S504, if the segment data control unit 413 determines that the video data received by the reception apparatus 102 is to be stored (YES in step S504), the segment data control unit 413 performs the processing in step S505. In step S505, from the reproduction section information about the plurality of pieces of segment data described in the playlist, the segment data control unit 413 selects the piece of segment data that has not been received and is highest in the reproduction order, and transmits a request for acquiring the selected segment data. A request for acquiring segment data is hereinafter referred to as a segment data request. The reproduction order is contained in reproduction section information about each segment data described in a playlist. The segment data that is highest in the reproduction order indicates the piece of segment data to be reproduced first among the plurality of pieces of segment data described in the playlist. As in the first exemplary embodiment, if the encoder unit generates each segment data in the same order as the reproduction order, the segment data that is highest in the reproduction order indicates the earliest segment data generated by the encoder unit. Thus, in the first exemplary embodiment, the segment data that is highest in the reproduction order, i.e., the earliest segment data generated by the encoder unit is referred to as the earliest segment data.

For a segment data request in step S505, the HTTP GET method is used similarly to the playlist request in step S501. With this method, in step S505, the segment data control unit 413 refers to location information such as URL information about the segment data described in the playlist received in step S502, and transmits a segment data request.

In step S506, the communication unit 412 receives the segment data transmitted from the transmission apparatus 100 based on the segment data request transmitted in step S505.

In step S507, the segment data control unit 413 determines whether the segment data received in step S506 is lowest in the reproduction order among the plurality of pieces of segment data described in the playlist received in step S502. Here, the segment data that is lowest in the reproduction order indicates the piece of segment data to be reproduced last among the plurality of pieces of segment data described in the playlist. As in the first exemplary embodiment, if the encoder unit generates each segment data in the same order as the reproduction order, the segment data that is lowest in the reproduction order indicates the latest segment data generated by the encoder unit. Thus, in the first exemplary embodiment, the segment data that is lowest in the reproduction order, i.e., the latest segment data generated by the encoder unit is referred to as the latest segment data.

In step S507, if the segment data control unit 413 determines that the received segment data is the latest segment data in the playlist (YES in step S507), in step S508, the decoder unit 409 and the display unit 408 decode and reproduce the segment data.

Further, in step S509, the storage unit 405 stores the segment data of the video data received in step S506, and the segment data reception processing is ended.

In step S507, if the segment data control unit 413 determines that the received segment data is not the latest segment data in the playlist (NO in step S507), in step S510, the segment data is only stored by the storage unit 405. Then, the processing returns to step S505 to receive unreceived segment data, and the processing in steps S505 to S507 is repeated. In this case, the decoder unit 409 and the display unit 408 do not decode and reproduce the segment data.

Through the processing in steps S507 to S509, when a communication delay or a processing delay occurs in storing the video data received by the reception apparatus 102, the decoding and reproduction processing is performed on only a predetermined piece of segment data. Consequently, discontinuity in reproduced video data can be minimized. Further, by performing the above-described processing when the video data received by the reception apparatus 102 is to be stored, the real-time performance of video data reproduction can be improved.

The processing in step S503 and step S504 will be described again.

In step S503, if the segment data control unit 413 determines that reproduction section information about a plurality of pieces of segment data is not described in the playlist (NO in step S503), the segment data control unit 413 performs the processing in step S511. In step S504, if the segment data control unit 413 determines that the video data received by the reception apparatus 102 is not to be stored (NO in step S504), the segment data control unit 413 performs the processing in step S511.

In step S511, from the reproduction section information about the plurality of pieces of segment data described in the playlist, the segment data control unit 413 selects the piece of segment data that is lowest in the reproduction order, or the piece of segment data that is a predetermined number higher in the reproduction order than the lowest segment data. Further, based on the selected segment data, the segment data control unit 413 transmits a segment data request. The segment data that is a predetermined number higher in the reproduction order than the lowest segment data indicates the piece of segment data to be reproduced a predetermined number of times earlier than the latest segment data among the plurality of pieces of segment data described in the playlist. The predetermined number is set based on the delay time allowed in reproducing the received video data. In the first exemplary embodiment, the predetermined number is set in the RAM 402.

Here, by setting the reception apparatus 102 to always select the latest segment data in a segment data request, the delay can be reduced as compared to selecting the earliest segment data. This enables video data streaming of high real-time performance. Further, by setting the reception apparatus 102 to select the segment data that is a predetermined number higher in the reproduction order than the lowest segment data, the streaming that considers the delay time allowed by the user can be realized in reproducing the video data.

In step S512, the communication unit 412 receives the segment data transmitted from the transmission apparatus 100 based on the segment data request transmitted in step S511.

In step S513, the decoder unit 409 and the display unit 408 decode and reproduce the segment data received in step S512.

Through the processing in each of step S511 to step S513, when a communication delay or a processing delay occurs if the video data received by the reception apparatus 102 is not to be stored, the reception apparatus 102 performs control such that the earliest segment data or the segment data exceeding the set delay time allowed is not to be received, decoded, or reproduced. Thus, when the video data received by the reception apparatus 102 is not to be stored, the real-time performance of video data reproduction can be improved. Further, the communication band can be saved and the processing load can be reduced.

Figure 6:
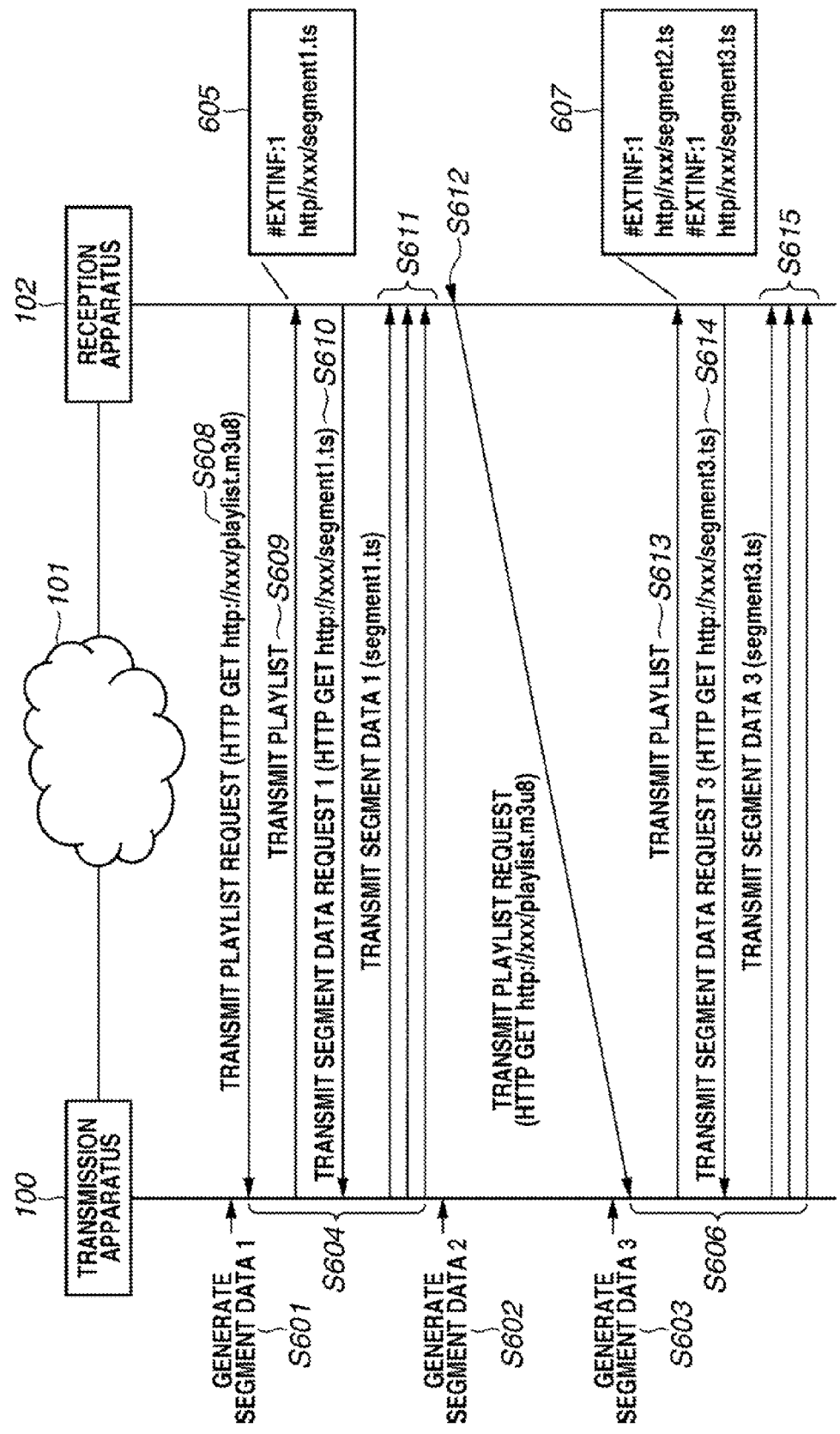
FIG. 6 illustrates, with a passage of time, transmission and reception processing of each segment data between the transmission apparatus and the reception apparatus according to the first exemplary embodiment when video data is not stored.
Figure 7:
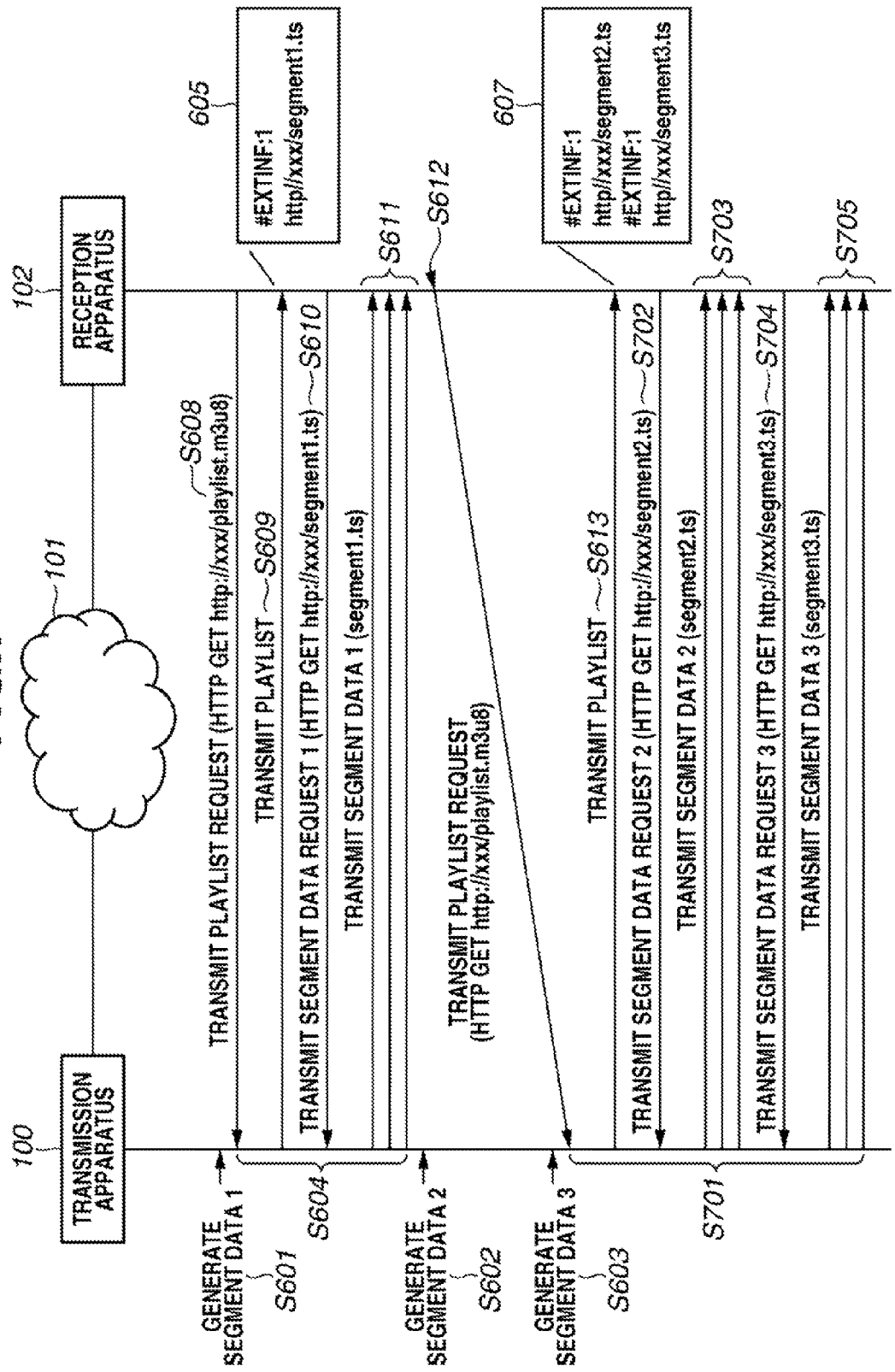
FIG. 7 illustrates, with a passage of time, transmission and reception processing of each segment data between the transmission apparatus and the reception apparatus according to the first exemplary embodiment when video data is stored.

With reference to FIG. 6 and FIG. 7, video data transmission and reception processing between the transmission apparatus 100 and the reception apparatus 102 according to the first exemplary embodiment will be described.

FIG. 6 illustrates with a passage of time an example of transmission and reception processing of each segment data between the transmission apparatus 100 and the reception apparatus 102 according to the first exemplary embodiment when the video data received by the reception apparatus 102 is not to be stored.

Steps S601, S602, and S603 indicate the generation timing of segment data 1, segment data 2, and segment data 3, respectively. In the first exemplary embodiment, the generation timing of the segment data 1 to 3 is constant at predetermined time intervals. In other words, the time interval in steps S601 and S602 is the same as the time interval in steps S602 and S603.

Step S604 illustrates video data transmission and reception to be performed by the transmission apparatus 100 and the reception apparatus 102 when no communication delay occurs in the network 101 or no processing delay occurs in the reception apparatus 102.

In step S608, the reception apparatus 102 transmits a playlist request to the transmission apparatus 100. In step S609, the transmission apparatus 100 that has received the playlist request transmits a playlist as a response (hereinafter referred to as a playlist response) to the reception apparatus 102.

A playlist 605 is transmitted and received between the transmission apparatus 100 and the reception apparatus 102 after the segment data 1 is generated by the transmission apparatus 100. The playlist 605 is metadata indicating the segment data that can be received by the reception apparatus 102 among a plurality of pieces of segment data generated by the encoder unit 212.

In the first exemplary embodiment, the playlist 605 describes the reproduction time and location information of the segment data 1 as the reproduction section information thereof. As illustrated in FIG. 6, the first line "#EXTINF:1" in the playlist 605 indicates that the reproduction time of the segment data 1 is one second. The second line "http://xxx/segment1.ts" indicates the location information (URL) of the segment data 1.

In step S610, based on the content of the received playlist 605, the reception apparatus 102 transmits a request for acquiring the segment data 1 to the transmission apparatus 100. In step S611, the transmission apparatus 100 that has received the segment data 1 acquisition request transmits the segment data 1 to the reception apparatus 102.

Step S606 illustrates video data transmission and reception to be performed by the transmission apparatus 100 and the reception apparatus 102 when a communication delay occurs in the network 101. As illustrated in FIG. 6, in step S602, the segment data 2 is generated by the transmission apparatus 100, and then, in step S612, a playlist request is transmitted from the reception apparatus 102 after the segment data 3 has been generated by the transmission apparatus 100 in step S603.

In this case (when a communication delay occurs in the network 101 as illustrated in FIG. 6), a playlist 607 is transmitted from the transmission apparatus 100. The playlist 607 describes reproduction section information (reproduction time and URLs) about the segment data 2 and the segment data 3. Specifically, "#EXTINF:1" in the first and third lines in the playlist 607 indicates that the reproduction time of each of the segment data 2 and the segment data 3 is one second. In the second line, "http//xxx/segment2.ts" indicates the URL of the segment data 2. In the fourth line, "http//xxx/segment3.ts" indicates the URL of the segment data 3. As described above, the previous reproduction section information about the segment data 1 described in the playlist 605 received by the reception apparatus 102 in step S609 is deleted from the playlist 607. In the playlist 607 received by the reception apparatus 102 in step S613, the reproduction section information about the segment data 2 and the segment data 3 newly generated by the transmission apparatus 100 is added.

The reception apparatus 102 determines that the received playlist 607 describes reproduction section information about a plurality of pieces of segment data, and further determines whether the reception apparatus 102 has been set not to store the video data. Thus, in step S614, the reception apparatus 102 transmits a request for acquiring the segment data 3, which is lower in the reproduction order in the plurality of pieces of segment data corresponding to the reproduction section information described in the playlist 607, to the transmission apparatus 100. In the first exemplary embodiment, the encoder unit 212 generates each segment data in the same order as the reproduction order. Thus, the segment data that is lower in the reproduction order indicates the newer segment data generated by the encoder unit.

In step S615, the transmission apparatus 100 that has received the segment data 3 acquisition request transmits the segment data 3 to the reception apparatus 102.

As described above, in the first exemplary embodiment, if the playlist 607 describes reproduction section information about a plurality of pieces of segment data, the reception apparatus 102 does not decode and reproduce the segment data 2 that is higher in the reproduction order in the plurality of pieces of segment data. Thus, according to the first exemplary embodiment, when the video data received by the reception apparatus 102 is not to be stored, the delay can be solved, and the real-time performance of video data reproduction can be ensured. Further, as compared o when all segment data is to be reproduced, selecting the segment data to be reproduced can reduce the processing load in the decoding and reproduction.

FIG. 7 illustrates an example of transmission and reception processing of each segment data between the transmission apparatus 100 and the reception apparatus 102 according to the first exemplary embodiment when the video data received by the reception apparatus 102 is to be stored. In FIG. 7, the same reference numbers are given to the sequence similar to that in FIG. 6, and the description thereof is omitted.

Step S701 illustrates video data transmission and reception to be performed by the transmission apparatus 100 and the reception apparatus 102 when a communication delay occurs in the network 101. In step S613, similarly to when the video data received by the reception apparatus 102 is not to be stored, which is illustrated in FIG. 6, the reception apparatus 102 receives the playlist 607 describing the reproduction section information about the segment data 2 and the segment data 3.

The reception apparatus 102 determines that the playlist 607 received in step S613 describes reproduction section information about a plurality of pieces of segment data, and further determines that the reception apparatus 102 has been set to store the video data. Thus, in step S702, the reception apparatus 102 transmits a request for acquiring the segment data 2 that is higher in the reproduction order in the plurality of pieces of segment data corresponding to the reproduction section information described in the playlist 607, to the transmission apparatus 100. In the first exemplary embodiment, the encoder unit generates each segment data in the same order as the reproduction order. Thus, the segment data that is higher in the reproduction order indicates the segment data generated earlier by the encoder unit.

In step S703, the transmission apparatus 100 that has received the segment data 2 acquisition request transmits the segment data 2 to the reception apparatus 102.

Then, in step S704, the reception apparatus 102 transmits a request for acquiring the segment data 3 that is lower in the reproduction order in the plurality of pieces of segment data corresponding to the reproduction section information described in the playlist 607, to the transmission apparatus 100. In step S705, the transmission apparatus 100 that has received the segment data 3 acquisition request transmits the segment data 3 to the reception apparatus 102.

According to the above-described exemplary embodiment, when the video data received by the reception apparatus 102 is to be stored, the reception apparatus 102 performs control such that the segment data 2 that is higher in the reproduction order is only stored without being decoded or reproduced, and the segment data 3 that is lower in the reproduction order is decoded, reproduced, and stored. By using the control, the real-time performance of video data reproduction can be improved while ensuring the continuity in the video data to be stored. Further, as compared to when all segment data is to be reproduced, selecting the segment data to be reproduced can reduce the processing load in the decoding and reproduction.

As described above, by the segment data reception control processing in the reception apparatus 102 according to the first exemplary embodiment, depending on whether the video data received by the reception apparatus 102 is to be stored, the segment data for which an acquisition request is to be transmitted is determined. This processing can minimize the discontinuity in the video data stored when a communication delay or a processing delay by the reception apparatus 102 occurs if the video data received by the reception apparatus 102 is to be stored in the reception apparatus 102. Further, if the video data received by the reception apparatus 102 is not to be stored in the reception apparatus 102, the real-time performance of video data reproduction can be improved.

Hereinafter, a second exemplary embodiment will be described.

In the above-described exemplary embodiment, the reception apparatus 102 is configured to control the reception of video data. In the second exemplary embodiment, based on a storage mode indicating whether the video data received by the reception apparatus 102 is to be stored, the transmission apparatus 100 performs control to determine the segment data to be transmitted.

Figure 8:
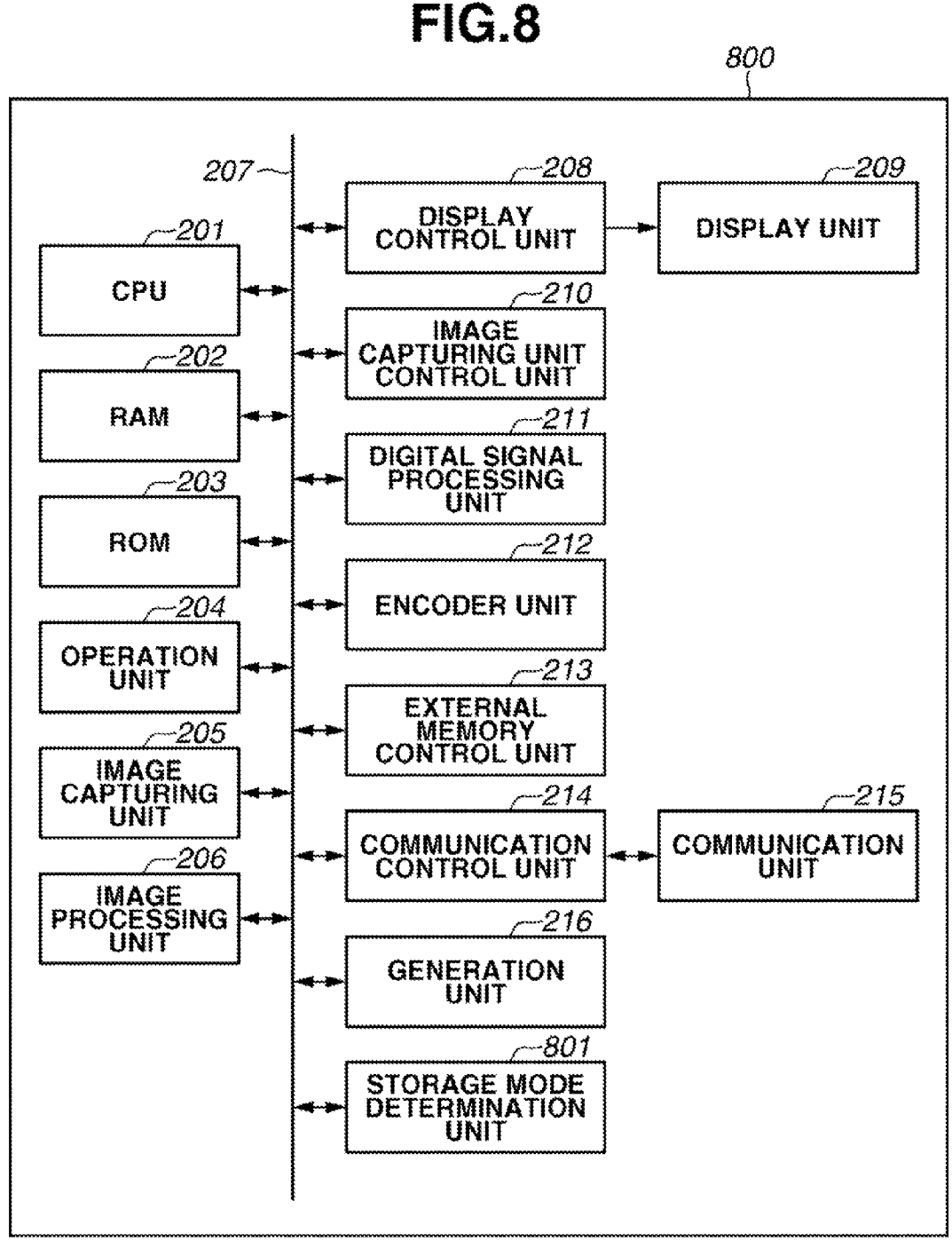
FIG. 8 is a block diagram illustrating an example of an internal configuration of a transmission apparatus according to the second exemplary embodiment.

FIG. 8 is a block diagram illustrating an example of an internal configuration of a transmission apparatus 800 according to the second exemplary embodiment. As illustrated in FIG. 8, the transmission apparatus 800 according to the second exemplary embodiment includes a storage mode determination unit 801. In FIG. 8, the same reference numbers are given to the processing units similar to those in FIG. 2, and the description thereof is omitted. Now, the processing of generating a playlist by the transmission apparatus 800 according to the second exemplary embodiment will be described in detail.

Figure 9:
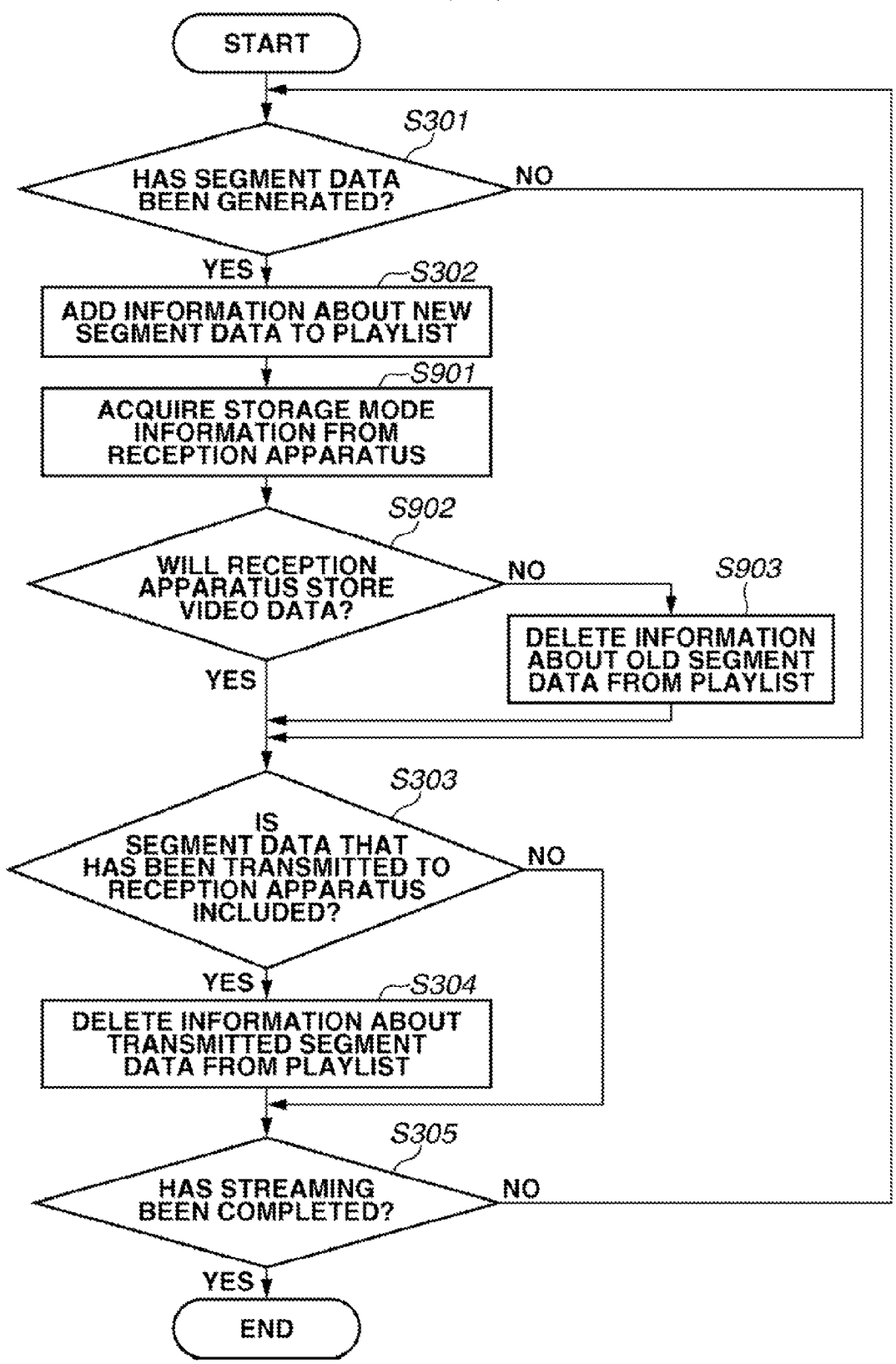
FIG. 9 is a flowchart illustrating an example of a playlist generation processing procedure performed by a generation unit in the transmission apparatus according to the second exemplary embodiment.

FIG. 9 is a flowchart illustrating an example of the playlist generation processing procedure performed by the generation unit 216 in the transmission apparatus 800 according to the second exemplary embodiment. In FIG. 9, the same reference numbers are given to the steps similar to those in FIG. 3, and the description thereof is omitted.

In step S302, the generation unit 216 adds the reproduction section information of the newly generated segment data to the playlist. Then, in step S901, the storage mode determination unit 801 acquires from the reception apparatus 102 a storage mode indicating whether to store the received video data. In this step, for example, the storage mode determination unit 801 can determine whether the video data received by the reception apparatus 102 is to be stored, by receiving from the reception apparatus 102 the reproduction section information about the storage mode selected on the operation unit 404 by the user.

In step S902, based on the storage mode acquired in step S901, the storage mode determination unit 801 determines whether the video data received by the reception apparatus 102 is to be stored.

In step S902, if the storage mode determination unit 801 determines that the video data is to be stored by the reception apparatus 102 (YES in step S902), the generation unit 216 performs the processing in step S303.

In step S902, if the storage mode determination unit 801 determines that the video data is not to be stored by the reception apparatus 102 (NO in step S902), the generation unit 216 performs the processing in step S903. In step S903, the generation unit 216 deletes the reproduction section information about the earliest segment data from the reproduction section information about the plurality of pieces of segment data described in the playlist.

Through the processing in each of the steps S901 to S903, when a communication delay and a processing delay occurs if the video data is not to be stored by the reception apparatus 102, only the reproduction section information about the newly generated segment data is described in the playlist generated by the transmission apparatus 800 according to the second exemplary embodiment. If the video data is to be stored by the reception apparatus 102, the playlist generated by the transmission apparatus 800 according to the second exemplary embodiment is similar to the playlist generated by the transmission apparatus 100 according to the first exemplary embodiment.

Figure 10:
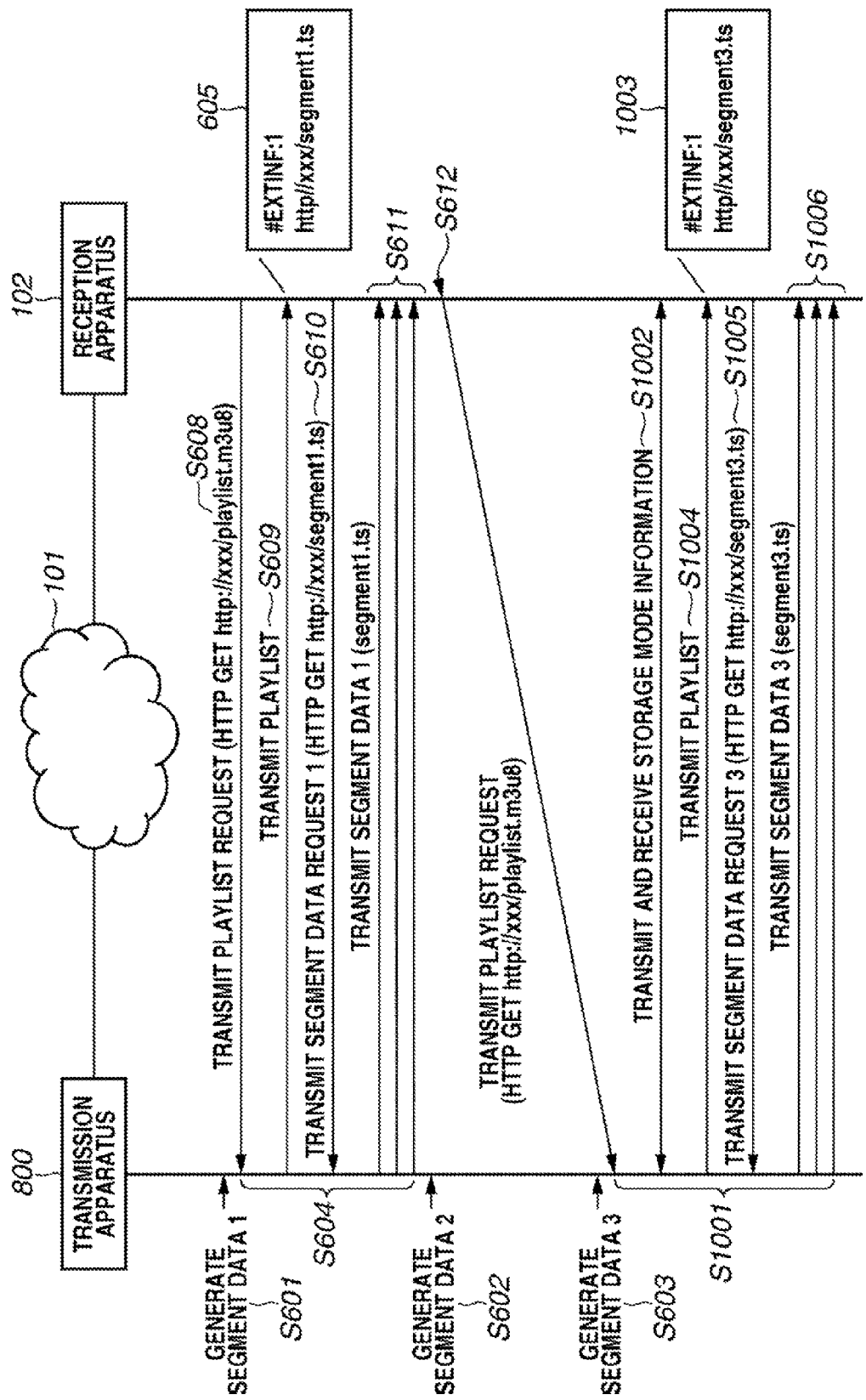
FIG. 10 illustrates, with a passage of time, transmission and reception processing of each segment data between the transmission apparatus and the reception apparatus according to the second exemplary embodiment when video data is not stored.

With reference to FIG. 10, transmission and reception processing between the transmission apparatus 800 and the reception apparatus 102 according to the second exemplary embodiment will be described.

FIG. 10 illustrates, with a passage of time, an example of transmission and reception processing of each segment data between the transmission apparatus 800 and the reception apparatus 102 according to the second exemplary embodiment when the video data received by the reception apparatus 102 is not to be stored. In FIG. 10, the same reference numbers are given to the sequence similar to that in FIG. 6, and the description thereof is omitted.

The relationship of data transmission/reception between the transmission apparatus 800 and the reception apparatus 102 when video data is to be stored by the reception apparatus 102 according to the second exemplary embodiment is similar to that in FIG. 7, and the description thereof is omitted.

Step S1001 illustrates video data transmission and reception to be performed by the transmission apparatus 800 and the reception apparatus 102 when a communication delay occurs in the network 101. It is assumed that, in step S602, the segment data 2 is generated, and then, in step S612, the playlist request is transmitted from the reception apparatus 102 after the segment data 3 has been generated by the transmission apparatus 800 in step S603, similarly to the first exemplary embodiment.

In step S1002, the reception apparatus 102 transmits information about the storage mode set in the reception apparatus 102, and the transmission apparatus 800 receives the information.

In step S1004, the transmission apparatus 800 transmits the playlist generated by the generation unit 216 in the transmission apparatus 800, and the reception apparatus 102 receives the playlist. In the playlist 1003, only the reproduction section information about the segment data 3 is described, and the reproduction section information about the segment data 2 has been deleted from the playlist 1003.

In step S1005, the reception apparatus 102 transmits a request for acquiring the segment data 3 described in the playlist 1003 to the transmission apparatus 800. In step S1006, the transmission apparatus 800 that has received the segment data 3 acquisition request transmits the segment data 3 to the reception apparatus 102.

As described above, the transmission apparatus 800 according to the second exemplary embodiment generates a playlist so that the segment data to be transmitted is changed depending on whether the video data received by the reception apparatus 102 is to be stored. This processing can minimize the discontinuity in the video data stored when a communication delay or a processing delay by the reception apparatus 102 occurs if the video data received by the reception apparatus 102 is to be stored. Further, the real-time performance of video data reproduction can be improved when a communication delay or a processing delay by the reception apparatus 102 occurs if the video data received by the reception apparatus 102 is not to be stored. Furthermore, as compared to when all segment data is to be reproduced, selecting the segment data to be reproduced can reduce the processing load in the decoding and reproduction.

Hereinafter, a third exemplary embodiment will be described.

In the above-described first and second exemplary embodiments, the description has been made on the assumption that the processing units 212, 214, 216, 409, 411, 413, and 801 illustrated in each of FIG. 2, FIG. 4, and FIG. 8 are configured as hardware. Alternatively, the processing performed in each of the processing units 212, 214, 216, 409, 411, 413, and 801 illustrated in these diagrams can be implemented with a computer program.

In such a case, the CPU 201 in FIG. 2 performs overall control of the computer using the computer program and data stored in the RAM 202 and the ROM 203, and performs each of the above-described processing similarly to the processing implemented by the transmission apparatus according to the above-described exemplary embodiments. That is, the CPU 201 functions as the processing units 212, 214 and 216.

Further, the CPU 401 in FIG. 4 performs overall control of the computer by using the computer program and data stored in the RAM 402 and the ROM 403, and performs each of the above-described processing similarly to the processing implemented by the reception apparatus according to the above-described exemplary embodiments. That is, the CPU 401 functions as the processing units 409, 411, and 413.

Further, the CPU 201 in FIG. 8 performs overall control of the computer by using the computer program and data stored in the RAM 202 and the ROM 203, and performs each of the above-described processing similarly to the processing implemented by the transmission apparatus according to the above-described exemplary embodiments. That is, the CPU 201 functions as the processing units 212, 214, 216, and 801.

The operation in the above-described configurations is implemented mainly by the CPUs 201 and 401 by controlling the operation described with reference to the above-described flowcharts.

Hereinafter, other exemplary embodiments will be described.

In each of the above-described exemplary embodiments, as the encoding and decoding method of video data, MPRG-2 is used. The encoding and decoding method is not limited to MPEG-2, and other encoding and decoding methods of video data such as MPEG-4 AVC/H.264, and VC-1 can be employed.

In each of the above-described exemplary embodiments, as the container format for encoded video data, MPEG-2 TS is used. The container format is not limited to MPEG-2 TS, and other container formats suitable for streaming such as the MP4 format and the MOV format can be employed.

In each of the above-described exemplary embodiments, as the format for the playlist, the M3U8 format is used. The format is not limited to the M3U8 format, and other playlist formats such as the M3U format and the Windows Media Player Playlist (WPL) format can be used.

In each of the above-described exemplary embodiments, each of the playlists 605, 607, and 1003 describes, as the metadata indicating the segment data that can be received by the reception apparatus 102, the reproduction time and location information of the segment data. However, the present embodiment is not limited thereto. Each of the playlists 605, 607, and 1003 may include, for example, the reproduction time, location information (URL, address information, and the like), reproduction order, and end information of the segment data, and it is not necessary to include all of the information.

In each of the above-described exemplary embodiments, based on the storage mode indicating whether the video data received by the reception apparatus 102 is to be stored, the segment data to be transmitted by the transmission apparatus 100 is determined. However, the present embodiment is not limited thereto. Based on whether the reception apparatus 102 is in the mode where video data is reproduced in real time, the segment data to be transmitted by the transmission apparatus 100 can be determined. More specifically, if the reception apparatus 102 is in the mode where video data is reproduced in real time, the transmission apparatus 100 and the reception apparatus 102 can be controlled to acquire the segment data that is lower in the reproduction order than when the reception apparatus 102 is not in the mode where video data is reproduced in real time.

Further, based on whether the reception apparatus 102 is in the mode where a delay in receiving the video data is permitted, the segment data to be transmitted by the transmission apparatus 100 can be determined. More specifically, if the reception apparatus 102 is in the mode where a delay in receiving the video data is permitted, the transmission apparatus 100 and the reception apparatus 102 can be controlled to acquire the segment data that is higher in the reproduction order than when the reception apparatus 102 is not in the mode where a delay in receiving the video data is permitted.

Furthermore, based on whether the reception apparatus 102 is in the mode where all of the video data received by the reception apparatus 102 is reproduced without discontinuity, the segment data to be transmitted by the transmission apparatus 100 can be determined. More specifically, if the reception apparatus 102 is in the mode where all of the video data received by the reception apparatus 102 is reproduced without discontinuity, the transmission apparatus 100 and the reception apparatus 102 can be controlled to acquire the segment data that is higher in the reproduction order than when the reception apparatus 102 is not in the mode where all of the video data received by the reception apparatus 102 is reproduced without discontinuity.

In each of the above-described exemplary embodiments, when the segment data to be transmitted by the transmission apparatus 100 is determined based on the storage mode indicating whether the video data received by the reception apparatus 102 is to be stored, the reproduction order described in the playlist is used. However, the present embodiment is not limited thereto. Instead of the reproduction order of the segment data, other orders such as the generation order of segment data in the transmission apparatus 100, and the storage order of segment data in the reception apparatus 102 can be used to determine the segment data to be transmitted by the transmission apparatus 100.

In each of the above-described exemplary embodiments, as the data transfer protocol, HTTP is used. The data transfer protocol is not limited to HTTP, and other protocols in the same layer in the OSI reference model such as HTTPS, TCP, and UDP, or other protocols in another layer can be used.

In each of the above-described exemplary embodiments, the transmission apparatus 100 and the transmission apparatus 800 includes the image capturing unit 205 as illustrated in FIG. 2 and FIG. 8, respectively. The present embodiment is not limited thereto. Instead of the image capturing unit 205, an acquisition unit for acquiring video data can be provided. In such a case, the video data acquired by the acquisition unit is transmitted, similarly to the video data acquired in the image capturing unit 205, to a predetermined processing unit via the bus 207.

In each of the above-described exemplary embodiments, the transmission apparatus 100 and the transmission apparatus 800 includes the encoder unit 212 as illustrated in FIG.

2 and FIG. 8, respectively. The present embodiment is not limited thereto. Instead of the encoder unit 212, a segment acquisition unit for acquiring segment data can be provided. In such a case, segment data generated in an apparatus other than the transmission apparatus 100 is to be acquired with the segment acquisition unit. The segment data acquired by the segment acquisition unit is transmitted, similarly to the segment data generated in the encoder unit 212, to a predetermined processing unit via the bus 207.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A reception apparatus configured to receive a segments including content data from a transmission apparatus, the reception apparatus comprising:
    a metadata reception unit configured to receive metadata indicating URL information for requesting the segment and ordering information of the segment;
    a determination unit configured to determine whether a mode of the reception apparatus is a store mode for storing the content data; and
    a transmission unit configured to, when the metadata received by the metadata reception unit includes information of a plurality of segments which have not been acquired by the reception apparatus from the transmission apparatus,
        (i) transmit a plurality of requests for acquiring the plurality of segments based on an order according to the ordering information indicated by the metadata, in a case where the determination unit determines that the mode of the reception apparatus is the store mode, and
        (ii) transmit a request for acquiring a latest segment of the plurality of segments, in a case where the determination unit determines that the mode of the reception apparatus is not the store mode.

2. The reception apparatus according to claim 1, wherein the determination unit determines that the mode of the reception apparatus is a live mode for reproducing the content data and not to store the content data, when the determination unit determines that the mode of the reception apparatus is not the store mode.

3. The reception apparatus according to claim 1, wherein the metadata reception unit is configured to receive the metadata from the transmission apparatus.

4. The reception apparatus according to claim 1, wherein the content data is at least one of video data and audio data.

5. The reception apparatus according to claim 1, wherein the determination unit does not determine the mode of the reception apparatus, in a case where the metadata received by the metadata reception unit includes information of one segment which have not been acquired by the reception apparatus from the transmission apparatus, and the transmission unit transmits a request for acquiring the one segment to the transmission apparatus.

6. The reception apparatus according to claim 1, wherein the transmission unit does not transmit a request for acquiring at least one segment, which has not been acquired by the reception apparatus from the transmission apparatus, among the plurality of segments whose information is indicated by the metadata received by the metadata reception unit, in a case where a number of the plurality of segments is larger than a predetermined threshold and the determination unit determines that the mode of the reception apparatus is not the store mode.

7. The reception apparatus according to claim 1, wherein a segment stored in a storage unit according to the store mode is reproducible based on a reproduction instruction by a user.

8. A method of receiving, at a reception apparatus, a segment including content data from a transmission apparatus, the method comprising:
    receiving metadata indicating URL information for requesting the segment and ordering information of the segment;
    determining whether a mode of the reception apparatus is a store mode for storing the content data; and
    transmitting, when the metadata received includes information of a plurality of segments which have not been acquired, (i) a plurality of requests for acquiring the plurality of segments based on an order according to the ordering information indicated by the metadata in a case where it is determined that the mode of the reception apparatus is the store mode, and (ii) a request for acquiring a latest segment of the plurality of segments in a case where it is determined that the mode of the reception apparatus is not the store mode.

9. The method according to claim 8, further comprising determining that the mode of the reception apparatus is live mode for reproducing the content data and not store the content data when it is determined that the move of the reception apparatus is not the store more.

10. The method according to claim 8, further comprising receiving the metadata from the transmission apparatus.

11. The method according to claim 8, wherein the content data is at least one of video data and audio data.

12. A non-transitory computer readable medium including instructions stored thereon, the instruction when executed by one or more processors, executes a method of receiving, at a reception apparatus, one or more segments including content data from a transmission apparatus, the method comprising:
    receiving metadata indicating URL information for requesting the segment and ordering information of the segment;
    determining whether a mode of the reception apparatus is a store mode for storing the content data; and transmitting, when the metadata received includes information of a plurality of segments which have not been acquired, (i) a plurality of requests for acquiring the plurality of segments based on an order according to the ordering information indicated by the metadata in a case where it is determined that the mode of the reception apparatus is the store mode, and (ii) a request for acquiring a latest segment of the plurality of segments in a case where it is determined that the mode of the reception apparatus is not the store mode.

13. The non-transitory computer readable medium according to claim 12, further comprising
determining that the mode of the reception apparatus is live mode for reproducing the content data and not store the content data when it is determined that the move of the reception apparatus is not the store more.

14. The non-transitory computer readable medium according to claim 12, further comprising receiving the metadata from the transmission apparatus.

15. The non-transitory computer readable medium according to claim 12, wherein the content data is at least one of video data and audio data.

\* \* \* \* \*